May 17, 1927.  W. WINZENBURG ET AL  1,629,192
REFLECTOR LAMP FOR DIA-PROJECTION FOR CINEMATOGRAPHY
Filed June 23, 1923
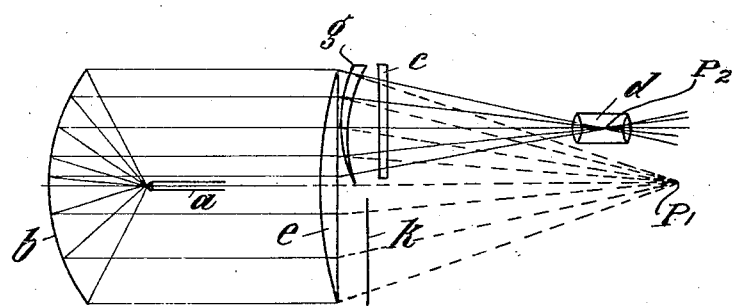

Patented May 17, 1927.

1,629,192

UNITED STATES PATENT OFFICE.

WILHELM WINZENBURG, OF KRAGENHOF, NEAR KASSEL, AND FRIEDRICH NOACK, OF KASSEL, GERMANY.

REFLECTOR LAMP FOR DIAPROJECTION FOR CINEMATOGRAPHY.

Application filed June 23, 1923. Serial No. 647,408.

This invention relates to cinematograph projection apparatus of the "mirror lamp" type in which a parabolic, ellipsoidal or other curved mirror is used to produce a beam of light by reflection of the light by reflection of the light from a source such as the crater of an arc lamp disposed on the principal axis of the mirror, and the object of the invention is to provide improvements in connection with projection apparatus of this type to enable the apparatus to be used for the projection of lantern slides as an alternative to cinematograph projection for displaying announcements or for other purposes. An embodiment of the invention is shown, by way of example, in the only figure of the accompanying drawing which shows in plan view an arrangement for reflector lamps with a condenser in which a wedge-shaped lens situated in the part which is free from shadow is utilized.

In apparatus of the type to which the invention relates the light for the crater of the positive electrode of an arc lamp is reflected by a parabolic or ellipsoidal mirror which directs a convergent beam upon the film window.

When apparatus of this type is used for the projection of lantern slides, it is necessary to bring the lantern slide nearer to the mirror than the film window in order to illuminate the whole of the slide, and it is found that the electrode casts a shadow on the lantern slide picture.

According to the present invention, this difficulty is overcome by arranging the lantern slide projection apparatus in such a manner that a part only of the beam produced by the mirror is used for the projection of the lantern slides, the part used being far from the shadow of the electrodes. If as generally required, the lantern slide picture has to be projected onto the same point as a cinematographic picture the bundle of light rays, which traverses the lantern slide picture and the lens, must be directed so that the ray which traverses the centre of the lantern slide picture is parallel to the optical axis of the mirror.

According to the only figure showing the arrangement for the projection of lantern slides mounted on a mirror lamp with condenser, the rays are by the condensing lens $e$ already collected in a point $P_1$ as indicated by dash lines. In order to fulfill the second condition also, e. g. that the ray traversing the centre of the lantern slide picture $c$ extends parallel to the optical axis of the mirror, it is necessary to insert between the condenser lens $e$ and the picture $c$ a wedge lens $g$ by which the point at which the rays join is brought to the point $P_2$ in the lens for projection of lantern slides $d$. The remaining rays are again intercepted by a diaphragm $k$.

The means shown in the figure designed for the projection of lantern slides can either be fixed on a convenient point of the stand for the cinematographic apparatus and the lamp casing can be arranged in such a manner that it can be placed behind these means, or these means could be fixed, on the frame for the lantern slide pictures and so that they can be brought by a single manipulation into a position in front of the lamp casing.

I claim:—

1. In a cinematographic projection apparatus, a reflector lamp for diaprojection, comprising, in combination, a concave mirror, a condensing lens located opposite said mirror, a source of light arranged between said lens and the mirror in front of the centre of the same, a lantern slide located opposite one half of said lens on the side counter to said source of light, optical means arranged between said slide and the respective half of said lens and adapted to direct the rays passing through it to said lantern slide, and means for intercepting the rays passing through the other half of the said lens.

2. In a cinematographic projection apparatus, a reflector lamp for diaprojection, comprising in combination, a concave mirror, a condensing lens located opposite said mirror, a source of light arranged between said lens and the mirror in front of the centre of the same, a lantern slide located opposite one half of said lens on the side counter to said source of light, a wedge lens arranged between said slide and the respective half of the condensing lens and adapted to direct the rays passing through it to said lantern slide, and means for intercepting the rays passing through the other half of the said condensing lens.

3. In a cinematographic projection apparatus, a reflector lamp for diaprojection, comprising, in combination, a concave mirror, a condensing lens located opposite said mirror, a source of light arranged between said lens and the mirror in front of the centre of the same, a lantern slide located opposite one half of said lens on the side counter to said source of light, optical means arranged between said slide and the respective half of said lens and adapted to direct the rays passing through it to said lantern slide, and a diaphragm located opposite the other half of said lens and being adapted to intercept the rays passing through this half of the said lens.

4. In a cinematographic projection apparatus, a reflector lamp for diaprojection, comprising in combination, a concave mirror, a condensing lens located opposite said mirror, a source of light arranged between said lens and the mirror in front of the centre of the same, a lantern slide located opposite one half of said lens on the side counter to said source of light, a wedge lens arranged between said slide and the respective half of the condensing lens and adapted to direct the rays passing through it to said lantern slide, and a diaphragm located opposite the other half of said lens and being adapted to intercept the rays passing through this half of the said lens, substantially as set forth.

In testimony whereof we affix our signatures.

WILHELM WINZENBURG.
DR. FRIEDRICH NOACK.